United States Patent [19]

Shoda

[11] Patent Number: 5,152,327
[45] Date of Patent: Oct. 6, 1992

[54] APPARATUS FOR PROVIDING A WARNING OF THE ROTATION OF A SPINDLE

[76] Inventor: Isao Shoda, 116-4, Okaba-cho, Hamamatsu-shi, Shizuoka-ken, Japan

[21] Appl. No.: 790,463

[22] Filed: Nov. 12, 1991

[30] Foreign Application Priority Data

Sep. 27, 1991 [JP] Japan .................. 3-276967

[51] Int. Cl.⁵ .......................... B23B 7/04; B27C 9/04
[52] U.S. Cl. ................... 144/1 A; 144/3 A; 144/252 R; 144/336; 408/16; 409/134; 409/231
[58] Field of Search ............... 408/16; 409/134, 231, 409/233; 144/1 R, 1 A, 2 R, 3 A, 134 R, 134 A, 356

[56] References Cited

U.S. PATENT DOCUMENTS

| | | | |
|---|---|---|---|
| 3,381,550 | 5/1968 | Smith | 409/134 |
| 4,478,538 | 10/1984 | Kakino | 409/134 |
| 4,949,942 | 8/1990 | Shoda | 144/1 A |

FOREIGN PATENT DOCUMENTS 60-13605  5/1985  Japan .
1-72303  5/1989  Japan .
1-33290  10/1989  Japan .

*Primary Examiner*—W. Donald Bray
*Attorney, Agent, or Firm*—Sughrue, Mion, Zinn, Macpeak & Seas

[57] ABSTRACT

An apparatus for providing a warning of the rotation of a spindle for a machine such as a wood working machine which gives a warning while a spindle continues to rotate due to inertia even after a motor driver for a spindle motor for rotating the spindle is interrupted thus enhancing the safety of operation of the machine. The apparatus comprises a warning device for warning that the spindle is rotating, a rotation detecting device for detecting rotation of the spindle and continuously generating, while the spindle is rotating, an electric signal independently of whether the motor driver is operative or inoperative, and a controller for discriminating between the presence and absence of an electric signal from the rotation detecting device and controlling the warning device in accordance with a result of the discrimination.

10 Claims, 7 Drawing Sheets

APPARATUS FOR PROVIDING A WARNING OF THE ROTATION OF A SPINDLE

BACKGROUND OF THE INVENTION

1. Field of the Invention

This invention relates to a machine such as a wood working machine wherein a tool is mounted on a spindle which is rotated by a spindle motor to rotate the tool together therewith, and more particularly to a warning apparatus for a machine of the type mentioned for indicating rotation of the spindle.

2. Description of the Prior Art

A conventional machine of the type mentioned commonly includes a power source lamp disposed, for example, on a front face of a working head. The power source lamp is lit when a power source for a motor driver or driving circuit for driving a spindle motor is turned on in order to give a warning that a spindle is rotating. The power source lamp is extinguished when the power source is turned off. The working machine of such construction, however, is not very safe in that the spindle continues its rotation for some time, due to the inertia thereof, after the power source is turned off.

For example, in a wood working router of the type wherein a working operation is performed automatically by numerical control, a spindle and a tool mounted on the spindle rotate at a very high speed, for example, at 20,000 rpm, and even after a motor driving circuit for driving a spindle motor is turned off, even where the wood working router includes a brake for the spindle, the spindle and the tool will not be stopped immediately, but will continue their rotation for several tens of seconds to several minutes due to their own inertia.

In such a wood working router, since wood to be worked is comparatively frequently operated manually on a table and tools are sharp and in most cases have a blade on a circumferential face thereof, even if a tool is rotating at a low speed, it is very dangerous. Particularly in such a wood working router wherein a spindle motor is accommodated in a motor hood with a dust collecting passageway defined there between and a ring-shaped dust collecting brush is provided so as to extend vertically downwardly from a circumferential edge at a lower end of the motor hood so as to collect chips of wood during working as disclosed, for example, in Japanese Utility Model Publication Application No. 60-13605, Japanese Utility Model Publication Application No. 1-33290 and Japanese Utility Model Laid-Open Application No. 1-72303, the tool is hidden by the dust collecting brush and cannot be observed from outside the dust collecting brush. Accordingly, an operator cannot determine by visual observation whether or not rotation of the tool has stopped. However, since the operator's hand can readily be placed the inside of the dust collecting brush, the danger is particularly high.

SUMMARY OF THE INVENTION

It is an object of the present invention to provide an apparatus for providing a warning of the rotation of a spindle for a working machine which gives a warning while a spindle continues to rotate due to its own inertia, even after a power source for a spindle motor for rotating the spindle is interrupted, to assure the safety of operation on the working machine.

In order to attain this object, according to the present invention, there is provided an apparatus for providing a warning of the rotation of a spindle of a working machine such as a wood working machine wherein the spindle is rotated by a spindle motor connected to a motor driver to integrally rotate a tool mounted thereon, comprising warning means for warning that the spindle is rotating, rotation detecting means for detecting rotation of the spindle and continuously generating, while the spindle is rotating, an electric signal independently of whether the motor driver is operative or inoperative, and controlling means for discriminating between the presence or absence of an electric signal from the rotation detecting means and controlling the warning means in accordance with a result of such a discrimination.

With the above mentioned apparatus, even after the motor driver is rendered inoperative to turn the power source for the spindle motor off, rotation of the spindle due to inertia, is detected by the rotation detecting means, and warning provided by the warning means is continued as long as the spindle is rotating. Accordingly, an inadvertent accident which may otherwise be caused possibly by a tool attached to the spindle during inertial rotation can be prevented, and consequently, the safety of the operation is enchanced.

The warning means may include a light emitting element which emits light when the controlling means discriminates either presence or absence of an electric signal from the rotation detecting means.

Preferably, the controlling means includes a timer and controls the warning means so as to stop a warning operation of the warning means after lapse of a preset time of the timer after the controlling means discriminates the absence of an electric signal from the rotation detecting means.

Preferably, the controlling means discriminates, after starting and after stopping of the spindle motor by the motor driver, between the presence or absence of an electric signal from the rotation detecting means and controls the warning means in accordance with a result of such discrimination.

The rotation detecting means may include a proximity sensor provided on a stationary portion of the spindle motor, and an operating element provided on the spindle for causing the proximity sensor to be switched between on and off states in response to rotation of the spindle. The operating element may be a groove formed in the spindle.

Alternatively, the rotation detecting means may include an optical sensor having a light emitting portion and a light receiving portion, and optical means provided on the spindle for allowing light from the light receiving portion of the optical sensor to be introduced intermittently into the light receiving portion in response to rotation of the spindle.

Where the working machine includes interlocking means for mechanically locking rotation of the spindle, preferably the apparatus further comprises interlocking detecting means for detecting a locked condition of the spindle by the interlocking means, and the controlling means is responsive to the interlocking detecting means to permit starting of the motor driver only when the spindle is not in a locked condition.

Where the working machine is a wood working router wherein the spindle motor is accommodated in a motor hood in such a manner as to define therebetween a dust collecting passageway, preferably a dust collecting brush is provided so as to extend vertically downwardly from a lower end edge of the motor hood.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
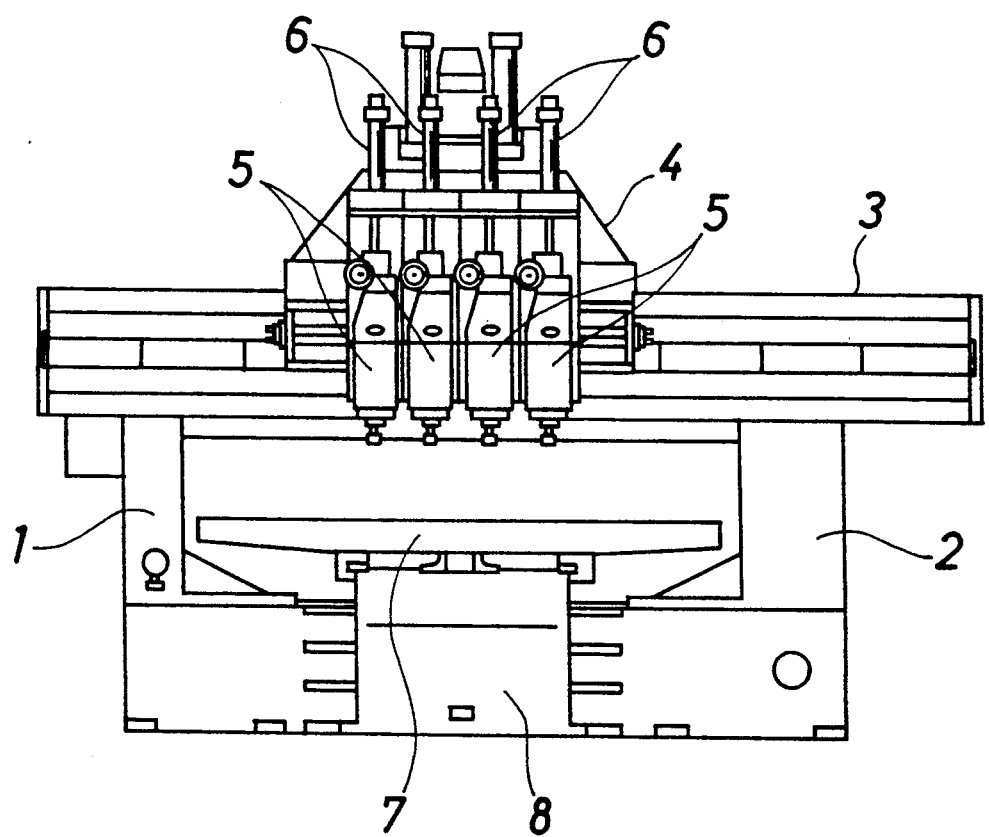
FIG. 1 is a front elevational view of an entire wood working router in which a rotation warning apparatus according to the present invention is incorporated.

Referring first to FIG. 1, there is shown an NC (numerically controlled) wood working router in which an apparatus for providing warning of the rotation of a spindle according to the present invention is incorporated. The wood working router shown includes a carriage 4 mounted for leftward and rightward sliding movement in a known manner on a beam 3 which extends horizontally between a pair of left and right columns 1 and 2. A plurality of, four in the arrangement shown in FIG. 1, working heads 5 are mounted in a leftwardly and rightwardly juxtaposed relationship for individual upward and downward movement on a front face of the carriage 4. Each of the working heads 5 is connected to an air cylinder 6 so that it may be moved upwardly or downwardly by the latter. A table 7 for receiving thereon wood to be worked is mounted for forward and rearward sliding movement on a bed 8.

Figure 2:
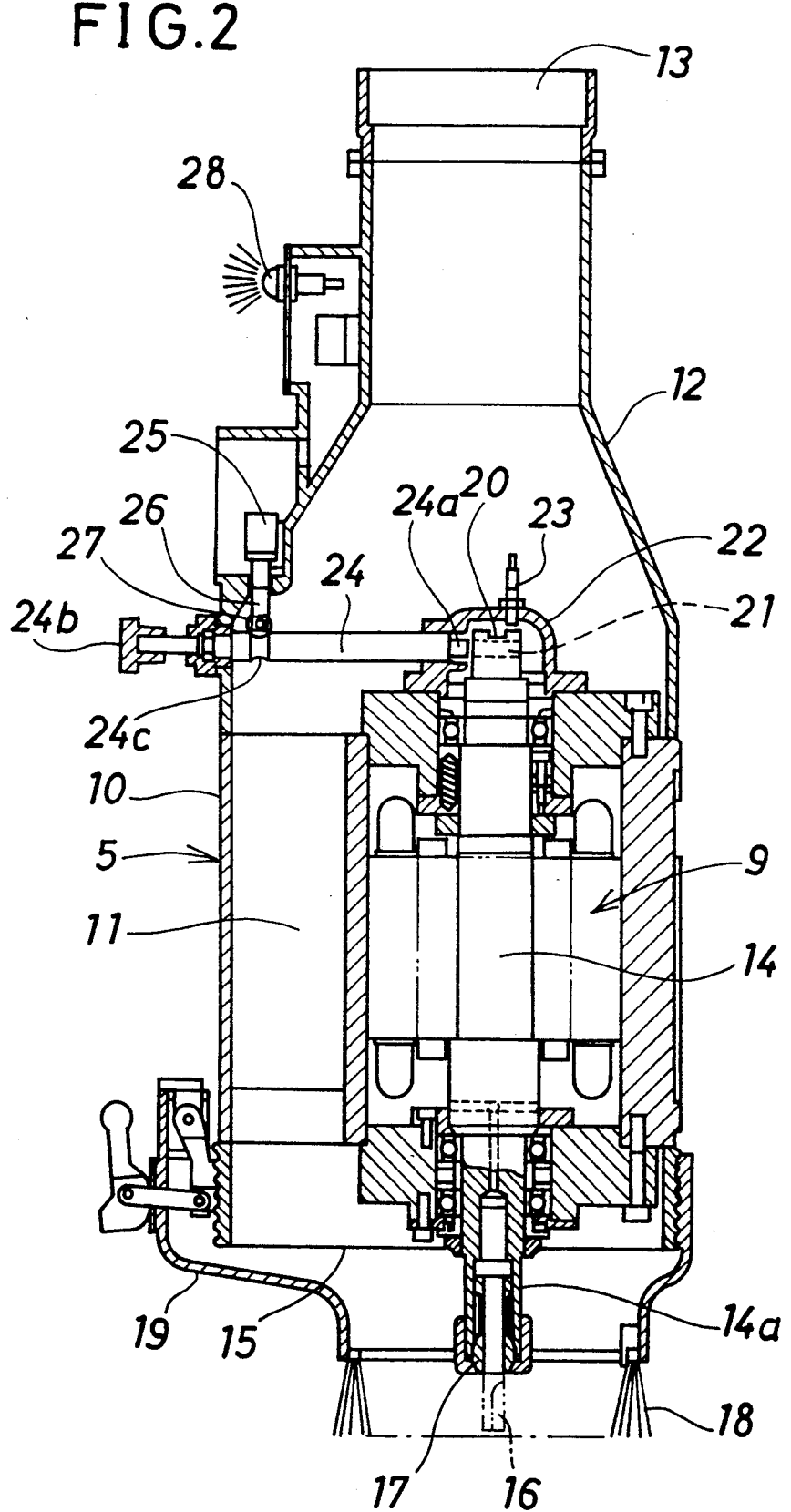
FIG. 2 is an enlarged vertical sectional view of a working head of the wood working router of FIG. 1.

A working head 5 is shown in detail in FIG. 2. Referring to FIG. 2, each of the working heads 5 includes a spindle motor 9 accommodated in a motor hood 10 with a dust collecting passageway 11 defined therebetween such that it extends vertically in the motor hood 10. The motor hood 10 has an upper extension 12 having an upper end at which a circular connecting port 13 is formed. The connecting port 13 is connected to an air supply duct which is provided commonly to all of the working heads 5 such that the dust collecting passageways 11 of all of the working heads 5 may suck air therethrough at the same time.

The spindle motor 9 may be of a known structure wherein a spindle 14, made of a ferromagnetic metal, extends verticallay therethrough and is directly rotated thereby. A lower end portion 14a of the spindle 14 extends downwardly from an opening 15 at a lower end of the motor hood 10. A fixing device or chuck 17 for exchangeably fixing a tool 16 such as a router bit thereto is provided at the lower end portion 14a of the spindle 14.

A dust collecting hood 19 is removably mounted on an outer periphery of a lower end portion of the motor hood 10 and has a dust collecting brush 18 mounted so as to extend vertically downwardly from a circumferential edge of the lower end opening thereof. The lower end portion 14a of the spindle 14 and the tool 16 fixed to the chuck 17 are surrounded by the dust collecting brush 18 and dust collecting hood 19 such that chips of wood cut by the tool 16 are immediately sucked and collected by way of the dust collecting passageway 11 and air supply dust.

Figure 3:
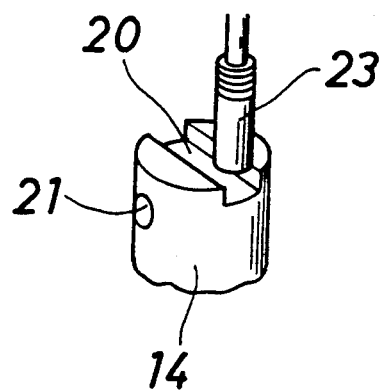
FIG. 3 is a perspective view of a mechanism of the working head of FIG. 2 for detecting rotation of a spindle.
Figure 4:
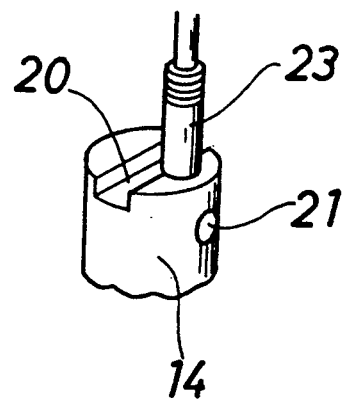
FIG. 4 is a similar perspective view but showing the mechanism of FIG. 3 in a different position.

Referring also to FIGS. 2 and 3, a horizontal groove 20 is formed diametrically at an upper end of the spindle 14, and a horizontal hole 21 is formed diametrically in the spindle 14 a little below the groove 20 such that it extends substantially perpendicularly to the groove 20. A proximity sensor 23 for detecting rotation of the spindle 14 is mounted on a top cover 22 which covers over an upper end portion of the spindle 14 at an upper end of the spindle motor 9 such that it may be opposed in a predetermined spaced relationship above the upper end of the spindle 14. Since the spindle 14 is made of a magnetic metal as described hereinabove, when the spindle 14 rotates, the proximity sensor 23 is alternately opposed to the top face and the groove 20 of the spindle 14 as seen from FIGS. 3 and 4. Consequently, while the spindle 14 is rotating at a low speed, a switching portion of the proximity sensor 23 is alternately turned on an off so that the proximity sensor 23 outputs a series of pulses. However, when the spindle 14 is rotating at a high speed, the switching operation of the switching portion of the proximity sensor 23 between on and off states cannot keep up with such a rotation of the spindle 14. Consequently, the proximity sensor 23 continuously assumes an on state and does not develop a pulse signal during high speed rotation.

In order to lock the spindle 14 from rotation when the working head 5 is not used, interlocking means and interlocking detecting means for detecting a locking condition and an unlocking condition of the interlocking means as described below are provided. In particular, referring back to FIG. 2, a locking rod 24 extends horizontally and is mounted for sliding movement between the upper extension 12 of the motor hood 10 and the top cover 22 of the spindle motor 9. The locking rod 24 has an axial projection 24a at an inner end thereof and is disposed such that the axial projection 24a thereof can be removably fitted into the horizontal hole 21 of the spindle 14. A knob 24b is mounted at an outer end of the locking rod 24, and an annular groove 24c is formed at an intermediate portion of the locking rod 24. An interlocking switch 25 in the form of a microswitch is mounted on the upper extension 12 of the motor hood 10. A small roller 27 is supported for rotation at a lower end of a sensing pin 26 of the interlocking switch 25 for engaging the annular groove 24c of the locking rod 24.

If the locking rod 24 is pushed axially inwardly to fit thye projection portion 24a at the inner end thereof into the horizontaol hole 21 of the spindle 14, then the spindle 14 is mechanically locked from rotation. When the locking rod 24 is in such locking position, the small roller 27 of the interlocking switch 25 is engaged with portions other than the annular groove 24c of the locking rod 24 that the sensing pin 26 is positioned at a higher position at which the microswitch 25 assumes an on state. On the contrary, if the locking rod 24 is drawn axially outwardly to pull the projected portion 24a thereof out of the horizontal hole 21 of the spindle 24, then the spindle 24 is placed into a rotatable condition. When the locking rod 24 is in such an unlocking position, the small roller 27 engages in the annular groove 24c to allow the sensing pin 26 to be positioned at a lower position at which the interlocking switch 25 assumes an off state.

A warning lamp 28 for warning that the spindle 14 is rotating is mounted on a front face of the upper extension 12 of the motor hood 19. All of the warning lamps 28 and spindle motors 9 are controlled by a programmable controller 29 shown in FIG. 5.

Figure 5:
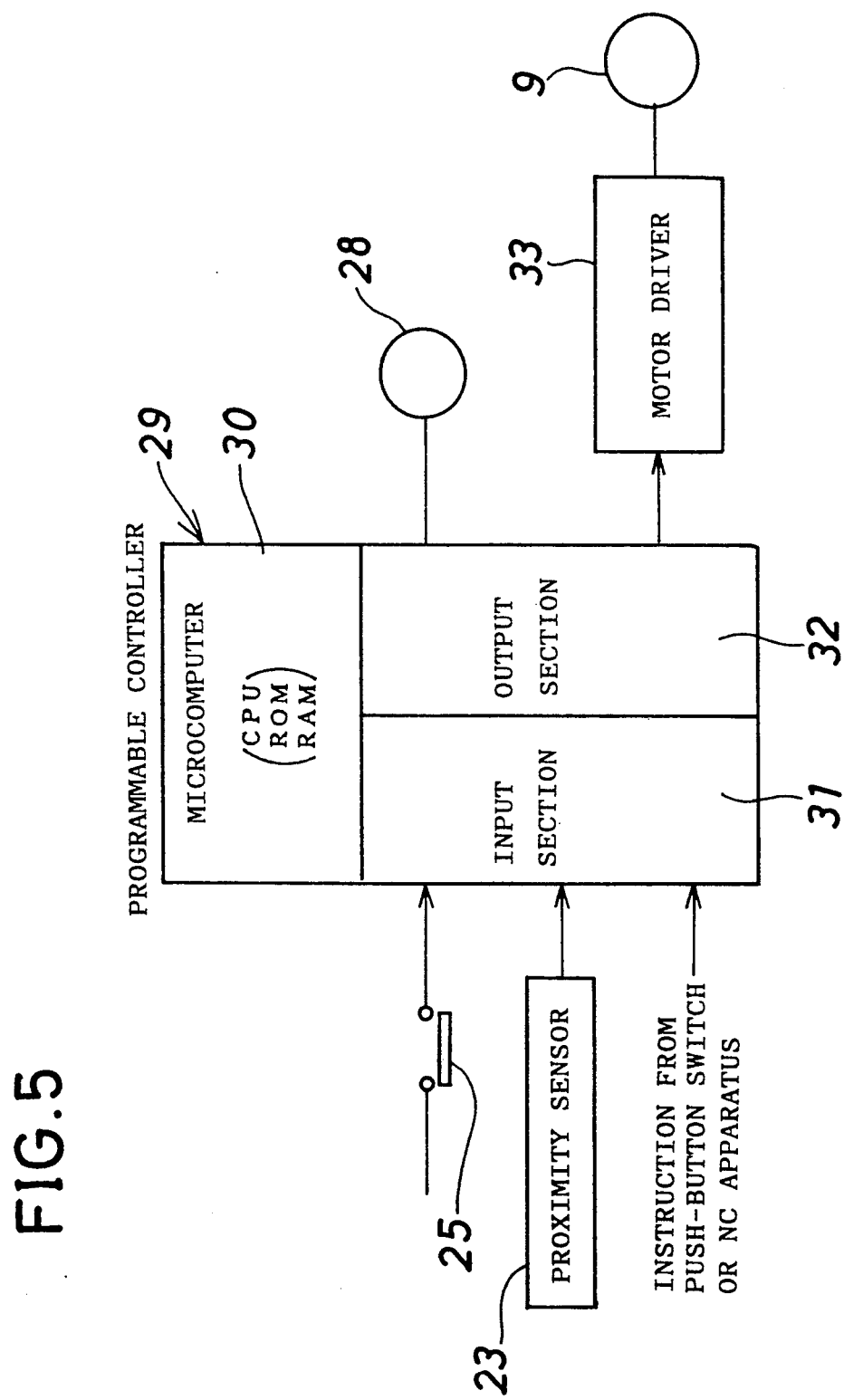
FIG. 5 is a block diagram of an apparatus for providing warning of the rotation of a spindle to which the present invention is applied.

Referring to FIG. 5, the programmable controller 29 includes a microcomputer 30 which includes a CPU (central processing unit), a ROM (read only memory) and a RAM (randon access memory), an input section 31 and an output section 32. The programmable controller 29 receives, at the input section 31 thereof, electric signals in the form of pulses produced from the proximity sensors 23 of the working heads 5, electric signals produced from the interlocking switches 25, and electric signals produced from push-button switches for starting and stopping the spindle motors 9 of the working heads 5 or an instruction signal from a numerically controlling (NC) apparatus. The microcomputer 30 processes signals thus received and controls operation of the spindle motors 9 and warning lamps 28 of the working heads 5 in accordance with a predetermined control program. In particular, a motor controlling signal is delivered from the output section 32 to a motor driver or driving circuit 33 provided for each of the spindle motors 9. The motor driver 33 which receives the motor controlling signal thus drives the corresponding spindle motor 9 in accordance with the controlling signal. Meanwhile, each of the warning lamps 28 is lit or extinguished in response to a lamp controlling signal from the output section 32 of the programmable controller 29.

Figure 6:
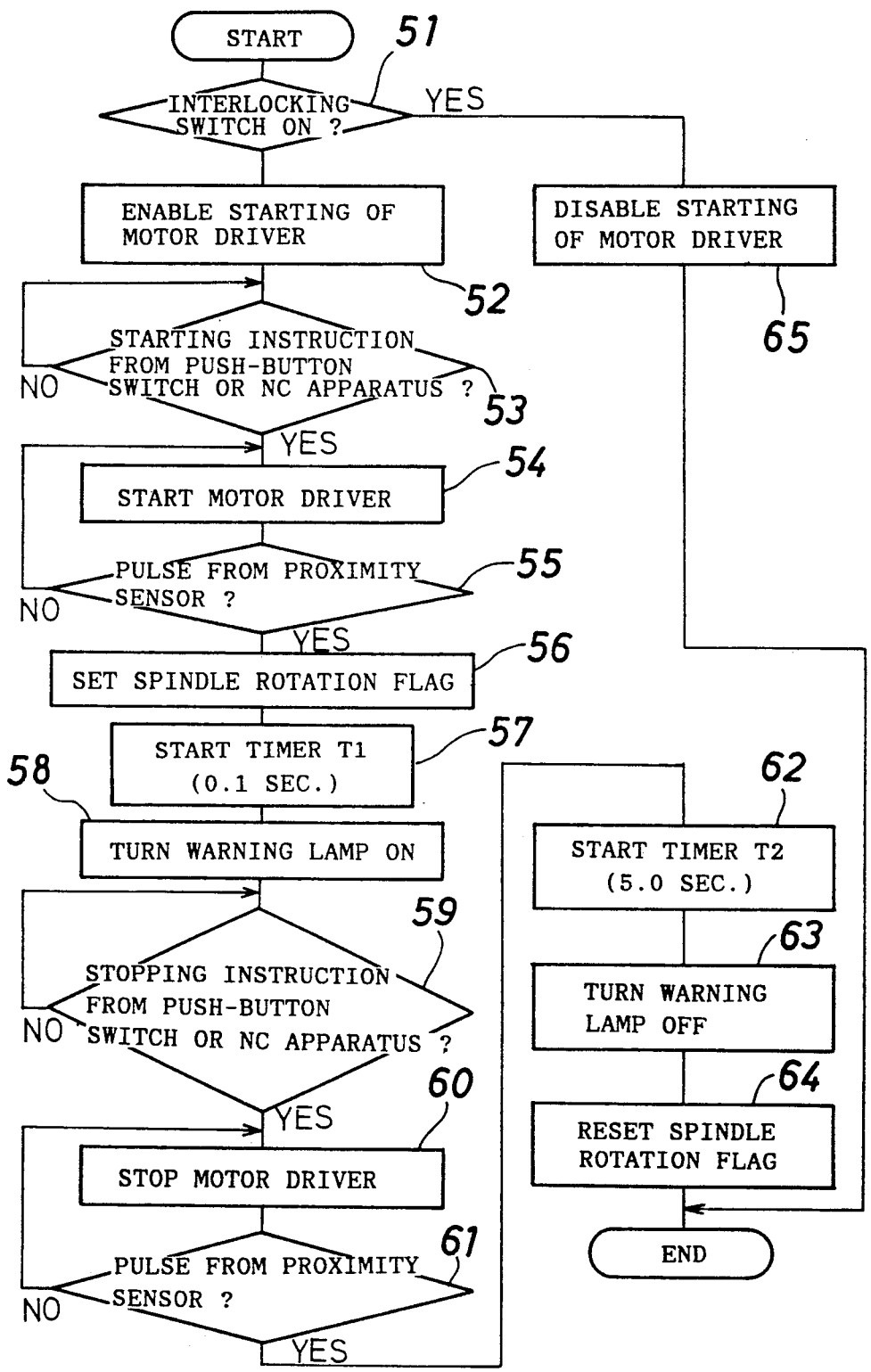
FIG. 6 is a flow chart illustrating operation of a spindle motor and a warning lamp of the rotation warning apparatus of FIG. 5.

FIG. 6 illustrates operation of the microcomputer 30 of the programmable controller 29 for controlling the spindle motor 9 and warning lamp 28 for each of the working heads 5. Referring first to FIG. 6, it is judged first at step 51 whether or not the interlocking switch 25 is in an on state, and if it is in an off state, that is, if the axial projected 24a of the locking rod 24 is not fitted in horizontal hole 21 of the spindle 12 and the spindle 14 is in a condition wherein it is allowed to rotate, then the control sequence advances to step 52, at which starting of the motor driver 33 is enabled.

Subsequently, it is judged at step 53 whether or not a starting instruction signal is received from the push-button switch or the NC apparatus, and if such instruction signal is received, then the motor driver 33 is rendered operative to drive the spindle motor 9 at step 54. Consequently, the spindle motor 9 is started, and the spindle 14 starts its rotation and a pulse or a series of pulses will be produced from the proximity sensor 23. Then, it is judged at step 55 whether or not a pulse is received from the proximity sensor 23, and if no pulse is received, then the control sequence returns to step 54. Consequently, after a first pulse is received from the proximity sensor 23, a spindle rotation flag is set at step 56. In other words, it is stored into the programmable controller 29, by means of the spindle rotation flag, that the spindle 14 is rotating.

Subsequently, a first timer T1 is started at step 57, and the warning lamp 28 it lit at step 58 after a lapse of a preset time of the timer T1 (for example, after 0.1 second). In other words, the warning lamp 28 is lit after a lapse of the preset time of the timer T1 after rotation of the spindle 14 has started.

Subsequently, it is judged at step 59 whether or not a stopping instruction signal is received from the push-button switch or the NC apparatus, and if such a stopping instruction signal is receivled, then the motor driver 33 is rendered inoperative to stop the spindle motor 9 at step 60. Then, in order to discriminate whether or not rotation of the spindle 14 due to inertia continues, it is judged at step 61 whether or not a pulse is received from the proximity sensor 23. If such pulse is received, or in other words, if the speed of inertial rotation of the spindle 14 has been reduced to, or lower than, a predetermined low level at which a pulse can be outputted from the proximity sensor 23, then a second timer T2 is started at step 62, and then, the warning lamp 28 is extinguished after lapse of the preset time of the timer T2. In other words, the warning lamp 28 is extinguished after the preset time of the timer T2 has lapsed after the speed of inertial rotation of the spindle 14 has been reduced to such a low level at which the switching operation of the switching portion of the proximity sensor 23 can respond to rotation of the spindle 14. Then, the spindle rotation flag is reset at step 64, thereby completing a series of steps of processing. It is to be noted that the preset time of the timer T2 is set to a sufficient time (for example, 5.0 seconds) for inertial rotation of the spindle 14 to come to an end.

When the interlocking switch 25 assumes an on state at step 51, or in other words, when the spinde 14 is held locked by the locking rod 24, starting of the motor driver 33 is disabled at step 65, thereby completing processing.

It is to be noted that, since such controlling operation is executed for each of the working heads 5, actually the programmable controller 29 executes such controlling operation in series, or occasionally in parallel, for the working heads 5. It is further to be noted that the flow chart of FIG. 6 only indicates necessary steps for controlling the spindle motor 9 and warning lamp 28 in connection with a warning operation as described above, and actually, the control program includes various other steps for operation of the wood working router. For example, a routine for performing a necessary cutting operation with a tool attached to the spindle 14 of the spindle motor 9 of the working head 5 may be interposed between steps 58 and 59 of the flow chart of FIG. 6.

Figure 7:
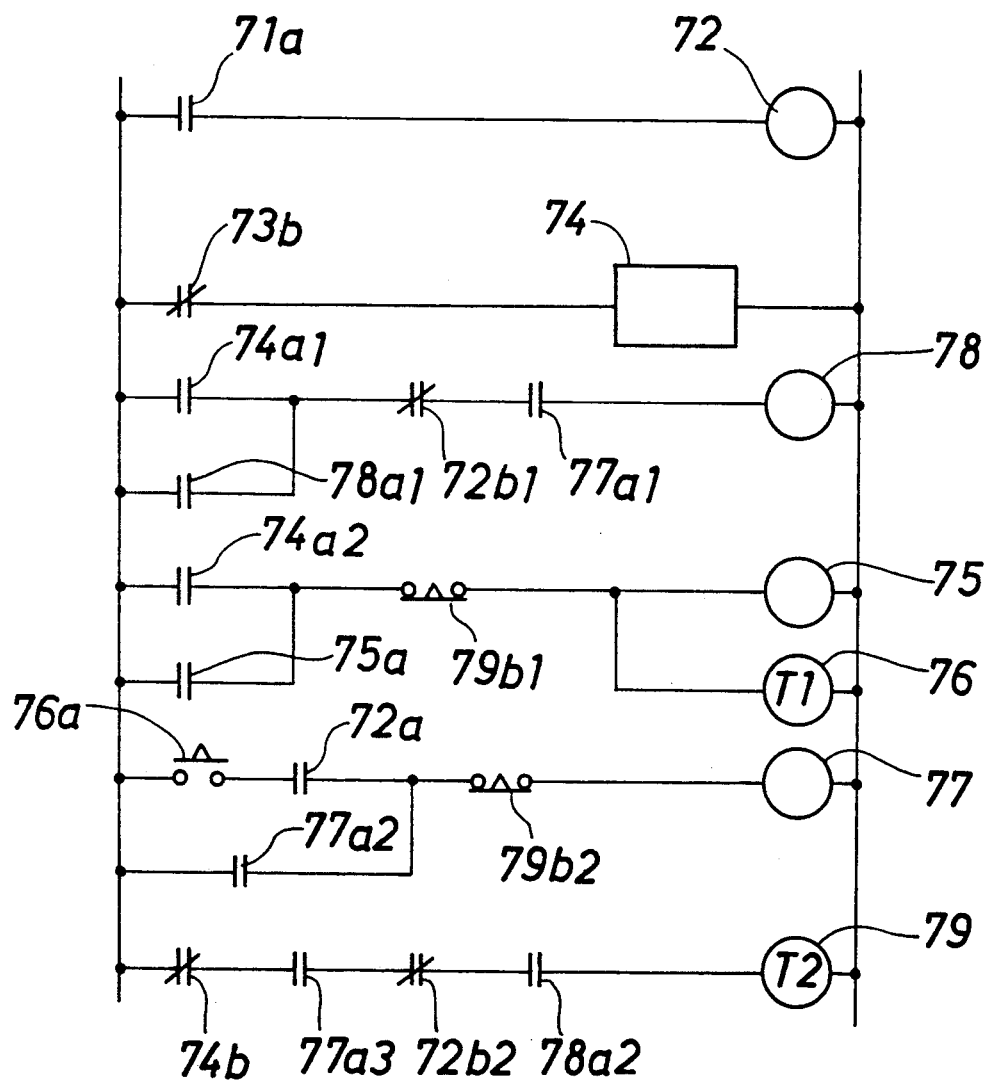
FIG. 7 is a sequence circuit diagram illustrating the operation of FIG. 6 in representation of relay symbols.

FIG. 7 shows the processing from step 53 to step 64 of FIG. 6 described above in the form of a sequence circuit diagram or ladder diagram using relay symbols. It is to be noted that, in the circuit diagram of FIG. 7, a normally open contact is denoted by a reference character of suffix "a" while a normally closed contact is denoted by reference character or suffix "b".

A normally open contact 71a represents a signal input from the push-button switch or the NC apparatus, and if the normally open contact 71a is closed, that is, if a starting signal is received from the push-button switch or the NC apparatus, a relay 72 is rendered operative so that a normally open contact 72a thereof is closed while normally closed contacts 72b1 and 72b2 thereof are opened. Meanwhile, since the relay 72 is rendered operative, the motor driver 33 of FIG. 5 is rendered operative so that the spindle motor 9 is started.

A normally closed contact 73b represents a pulse input from the proximity sensor 23, and if a pulse is inputted so that the normally closed contact 73b thereof is first opened and then closed, a relay 74 operates, in response to opening of the normally closed contact 74b, only for one scanning period of time of the CPU of the microcomputer 30 of FIG. 5 so that normally open contacts 74a1 and 74a2 of the relay 74 are closed momentarily while a normally closed contact 74b is opened momentarily for such a scanning period. When the normally open contact 74a2 is closed, another relay 75 is rendered operative so that a normally open contact 75a thereof is closed thereby to cause the relay 75 to hold itself to store that the spindle 14 is rotating while an on delay timer 76 which corresponds to the first timer T1 is started.

A normally open contact 76a of the on delay timer 76 is closed after lapse of a preset time (for example, after 0.1 second) of the on delay timer 76, and thereupon, a further relay 77 is rendered operative so that normally open contacts 77a1, 77a2 and 77a3 thereof are closed. Since the normally open contact 77a2 is closed, the relay 77 thereafter holds itself. Since the relay 77 thus holds itself, the warning lamp 28 thereafter presents a lit condition continuously.

In such condition, if a stopping signal is received from the push-button switch or the NC apparatus so that the normally open contact 71a is opened again, then the relay 72 is rendered inoperative so that the normally open contact 72a thereof is opened while the normally closed contacts 72b1 and 72b2 thereof are closed. Since the relay 72 is turned off, also the motor driver 33 is rendered inoperative and the spindle motor 9 is stopped. In the meantime, even if the normally open contact 72a is opened, since the relay 77 holds itself with the normally open contact 77a2 thereof closed, the warning lamp 28 remains in a lit condition.

If the speed of inertial rotation of the spindle 14 is reduced to such a low level that the normally closed contact 73b begins to be opened and closed, the relay 74 is rendered operative similarly as described above so that the normally open contacts 74a1 and 74a2 thereof are momentarily closed while the normally closed contact 74b is momentarily opened. In this instance, since the normally closed contact 72b1 of the relay 72 is in a closed state and also the normally open contact 77a1 of the relay 77 is in a closed state, another relay 78 is rendered operative so that normally open contacts 78a1 and 78a2 thereof are closed. Since the normally open contact 78a1 is closed, the relay 78 thereafter holds itself. Thus, it is discriminated that the spindle 14 further continues its inertial rotation.

On the other hand, since the normally closed contact 74b of the relay 74 and the normally open contact 78a2 of the relay 78 are closed, an off delay timer 79 which corresponds to the second timer T2 is started. When normally closed contacts 79b1 and 79b2 of the off delay timer 79 are opened after lapse of a preset time (for example, after 5.0 seconds) of the off delay timer 79, the relays 75 and 77 are rendered inoperative. Since the relay 77 is rendered inoperative, also the warning lamp 28 is extinguished. Meanwhile, since the relay 75 is rendered inoperative, the storage flag indicating that the spindle 14 is also rotating is cleared.

Figure 8:
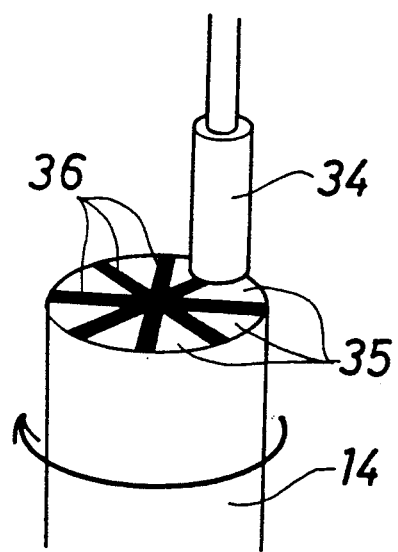
FIG. 8 is a perspective view of another mechanism for detecting rotation of a spindle.

Referring now to FIG. 8, there is shown another mechanism for detecting rotation of the spindle 14. In the arrangement shown, an optical sensor 34 of the known reflection type having a light emitting portion and a light receiving portion is used in place of the proximity sensor 23, and light reflecting portions 35 and light absorbing portions 36 are provided alternately in a circumferential direction on an upper end face of the spindle 14. When the spindle 14 rotates, reflected light from the reflecting portions 35 is intermittently introduced into the light receiving portion of the optical sensor 34 so that pulses are developed from the optical sensor 34.

It is to be noted that, while in the embodiment described above the warning lamp 28 is kept lit during rotation of the spindle 14 but is extinguished when the spindle 14 stops, alternatively the warning lamp 28 may be kept extinguished during rotation of the spindle 14 but lit when the spindle 14 stops. Preferably, a warning lamp which emits red light is employed as the warning lamp for the former case, but a warning lamp which emits green light is employed as the warning lamp for the latter case.

Meanwhile, a buzzer may be employed in place of the warning lamp as described hereinabove so as to give an audible warning that the spindle 14 is rotating. Further, as the sensor for detecting rotation of the spindle 14 as described hereinabove, any contactless sensor such as a proximity sensor or an optical sensor or any contacting type sensor may be employed. Further, the present invention can be applied not only to a wood working router but also to any other wood working machine which rotates a tool by means of a spindle and further to a metal working machine or a resin working machine.

Having now fully described the invention, it will be apparent to one of ordinary skill in the art that many changes and modifications can be made thereto without departing from the spirit and scope of the invention as set forth herein.

What is claimed is:

1. An apparatus for providing a warning of the rotation of a spindle of a machine such as a wood working machine wherein said spindle is rotated by a spindle motor connected to a motor driver to integrally rotate a tool mounted thereon, comprising:
    warning means for warning that said spindle is rotating;
    rotation detecting means for detecting rotation of said spindle and continuously generating, while said spindle is rotating, an electric signal independently of whether said motor driver is operative or inoperative; and
    controlling means for discriminating between the presence and absence of an electric signal from said rotation detecting means and controlling said warning means in accordance with a result of said discriminating.

2. An apparatus as claimed in claim 1, wherein said warning means includes a light emitting element which emits light when said controlling means discriminates the presence of an electric signal from said rotation detecting means.

3. An apparatus as claimed in claim 1, wherein said warning means includes a light emitting element which emits light when said controlling means discriminates the absence of an electric signal from said rotation detecting means.

4. An apparatus as claimed in claim 1, wherein said controlling means includes a timer and controls said warning means so as to stop a warning operation of said warning means after a preset time of said timer has elapsed after said controlling means discriminates the absence of an electric signal from said rotation detecting means.

5. An apparatus as claimed in claim 1, said controlling means discriminating, after starting and after stopping of said spindle motor by said motor driver, between presence and absence of an electric signal from said rotation detecting means and controls said warning means in accordance with a result of said discriminating.

6. An apparatus as claimed in claim 1, wherein said rotation detecting means includes a proximity sensor provided on a stationary portion of said spindle motor, and an operating element provided on said spindle for operating said proximity sensor to be switched between on and off states in response to rotation of said spindle.

7. An apparatus as claimed in claim 6, wherein said operating element is a groove formed on said spindle.

8. An apparatus as claimed in claim 1, wherein said rotation detecting means includes an optical sensor having a light emitting portion and a light receiving portion, and optical means provided on said spindle for allowing light from said light receiving portion of said optical sensor to be introduced intermittently into said light receiving portion in response to rotation of said spindle.

9. An apparatus as claimed in claim 1, wherein said machine includes interlocking means for mechanically locking rotation of said spindle, said machine further comprising interlocking detecting means for detecting a locked condition of said spindle by said interlocking means, said controlling means being responsive to said interlocking detecting means to permit starting of said motor driver only when said spindle is not in a locked condition.

10. An apparatus as claimed in claim 1, wherein said working machine is a wood working router and wherein said spindle motor is accommodated in a motor hood in such a manner as to define therebetween a dust collecting passageway, a dust collecting brush being provided so as to extend vertically downwardly from a lower end edge of said motor hood.

* * * * *